US012625327B2

(12) United States Patent
    Li

(10) Patent No.: US 12,625,327 B2
(45) Date of Patent: May 12, 2026

(54) SC TYPE OF CONNECTOR WITH STABLE STRUCTURE AND EASY INSTALLATION

(71) Applicant: Huizhou Fibercan Industrial Co., Ltd, Huizhou City (CN)

(72) Inventor: Yaole Li, Huizhou City (CN)

(73) Assignee: HUIZHOU FIBERCAN INDUSTRIAL CO., LTD, Huizhou City (CN)

( * ) Notice: Subject to any disclaimer, the term of this patent is extended or adjusted under 35 U.S.C. 154(b) by 351 days.

(21) Appl. No.: 18/424,026

(22) Filed: Jan. 26, 2024

(65) Prior Publication Data

US 2025/0172762 A1    May 29, 2025

(30) Foreign Application Priority Data

Nov. 28, 2023    (CN) .......................... 202311601119.X

(51) Int. Cl.
    G02B 6/38        (2006.01)
(52) U.S. Cl.
    CPC .................................. G02B 6/3807 (2013.01)
(58) Field of Classification Search
    None
    See application file for complete search history.

(56) References Cited

U.S. PATENT DOCUMENTS

| | | | | |
|---|---|---|---|---|
| 11,056,820 B2 * | 7/2021 | Li | .......................... | G02B 6/3879 |
| 11,340,409 B1 * | 5/2022 | Li | .......................... | G02B 6/3878 |
| 11,662,530 B2 * | 5/2023 | Li | .......................... | G02B 6/381 385/78 |
| 11,686,910 B1 * | 6/2023 | Li | .......................... | G02B 6/445 385/135 |
| 12,140,803 B2 * | 11/2024 | Li | .......................... | G02B 6/3833 |
| 2021/0159630 A1 * | 5/2021 | Li | .......................... | H01R 13/506 |
| 2023/0070900 A1 * | 3/2023 | Li | .......................... | G02B 6/387 |
| 2023/0393349 A1 * | 12/2023 | Li | .......................... | G02B 6/3833 |
| 2024/0094491 A1 * | 3/2024 | Li | .......................... | G02B 6/44265 |
| 2025/0172762 A1 * | 5/2025 | Li | .......................... | G02B 6/3821 |

* cited by examiner

*Primary Examiner* — Andrew Jordan
(74) *Attorney, Agent, or Firm* — McCoy Russell LLP

(57) ABSTRACT

Provided herein is an SC connector with a stable structure and an easy assembly. The SC connector has the characteristics of compact assembly, and the assembly mode of its inner core structure is more conducive to the integration after assembly. Especially after adhesive injection, as the mold closing seam of the inner core structure is not a split structure in the general sense, it is not easy to be separated and broken due to external force action, achieving better stability than existing general products. It can effectively prolong the service life of equipment in low-frequency vibration environment. As a pre-assembled connector with good performance, it can be easily assembled and reliable when used on-site, and can be quickly applied to line assemblies.

9 Claims, 5 Drawing Sheets

SC TYPE OF CONNECTOR WITH STABLE STRUCTURE AND EASY INSTALLATION

CROSS-REFERENCE TO RELATED APPLICATIONS

This application claims priority under 35 U.S.C. § 119 (a) to Chinese Patent Application No. 202311601119.X, filed on Nov. 28, 2023, which is hereby incorporated by reference herein in its entirety.

TECHNICAL FIELD

The disclosure belongs to the technical field of optical fiber communication, in particular to a SC connector with a stable structure and an easy installation.

BACKGROUND ART

Optical fiber connectors can be typically divided into a single-mode connector or a multi-mode connector for silicon-based optical fibers, as well as other optical fiber connectors with plastic as transmission media. According to the head structure of connectors, optical fiber connectors can be divided into a type of FC, SC, ST, LC, D4, DIN, MU, MT and so on. Among them, ST connectors are usually used for wiring equipment, such as optical fiber distribution frames and optical fiber modules. SC and MT connectors are usually used on the network equipment. According to the shape of fiber end face, there are FC, PC (including SPC or UPC) and APC connectors. According to the number of optical fiber cores, there are single-core and multi-core (such as MT-RJ) connectors. Optical fiber connectors have a wide range of applications and various types. In practical applications, optical fiber connectors are generally distinguished based on their different structures.

At present, CN212586598U discloses an SC-type optical fiber connector applied in on-site production, which comprises an inner housing assembly, an outer housing, a pin cylinder and a front end piece, wherein the inner housing assembly comprises an inner housing, a core and a connecting cylinder, the core is wrapped with a spring, and the connecting cylinder is sleeved at a right end of the core; outer wall of the connecting cylinder is provided with external threads; and the front end piece comprises a protective sleeve and a connecting sleeve, and the protective sleeve is sleeved at the right end of the connecting sleeve; and the inner wall of the connecting sleeve is provided with internal threads. This SC connector utilizes an internal and external threaded connection, thereby enhancing the stability of the assembled fiber optic body.

In view of the above existing technology, the improvement on the stability of the inner housing assembly is achieved by connecting the connecting sleeve and the connecting cylinder by a threaded connection. The connecting structure has the advantage of higher static tightness and better reliability after assembling, but has the disadvantage that it needs to be screwed to realize assembly, making the assembling steps relatively complex. Additionally, the inner housing itself is an integral structure. For the mounting of the core with a spring, it is required that the spring should be completely inserted from an opening end of the inner housing for assembly. However, the positioning of the spring relies on abutting against the connecting cylinder, and the elastic force of the spring actually exerts a slight force in a circumferential direction to the threaded connection. Therefore, the tightness of the above-mentioned structural combination will be obviously affected in dynamic environments. Targeted at this, it may be considered improving the assembly structure of the inner housing to enhance the dynamic stability of the SC connector and simplify the assembling steps to some extent.

SUMMARY

Aiming at the technical defects existing in the background art, the disclosure provides a versatile inner core structure for an SC connector, and an SC connector using the inner core structure, which solves the technical problems and meets the practical requirements. The specific technical scheme is as follows.

An SC connector with a stable structure and an easy installation comprises a cable body formed by wrapping an optical cable by a cable sleeve, and comprises a housing, a front sleeve and a rear sleeve, wherein the optical cable passes through a plug core rear base and is jointed with a plug core, and one end of the plug core rear base near the plug core is provided with a semi-arc limiting convex ring, and the cross-sectional profile of the semi-arc limiting convex ring is formed by mutually closing and jointing at least a semi-arc transition section and a limiting section symmetrical to a cross-sectional center and having a concave profile; the outer surface of the plug core rear base is tightly sleeved with a limiting spring with one end abutting against an end face of the semi-arc limiting convex ring; one end of the plug core rear base near the cable sleeve is provided with a limiting ring, and a sleeve covering the limiting ring and a part of the cable sleeve is sleeved outside the limiting ring, so that the limiting spring is limited between an end face of the sleeve and an end face of the semi-arc limiting convex ring.

An inner cavity of the front sleeve is formed by jointing four separate chambers, wherein the four chambers are respectively an open chamber for accommodating the plug core, a fixed chamber for accommodating the semi-arc limiting convex ring and the limiting spring, a bundling chamber for accommodating a part of the plug core rear base, and an introduction chamber for accommodating the cable sleeve, wherein the bundling chamber has a smaller inner diameter than its adjacent chambers, and the end of the rear sleeve also encases the outside of the part of the front sleeve with the introduction chamber.

The front sleeve consists of a first front sleeve half-housing and a second front sleeve half-housing which are integrated as a whole, and the fixed chamber, the bundling chamber and the introduction chamber are all formed by the combination of the first front sleeve half-housing and the second front sleeve half-housing through closure, while the open chamber is completely formed by the inner cavity of the first front sleeve half-housing.

The front sleeve is clamped within the housing, and the end of the plug core extends to the outside of the housing through an opening at one end of the housing.

The rear sleeve wraps around the outside of the introduction chamber and the cable sleeve, and the outer surface of the part of the front sleeve with the introduction chamber is provided with a engaging convex ring abutting against the inner wall of the rear sleeve.

According to one or more embodiments, the first front sleeve half-housing and the second front sleeve half-housing are attached and combined with each other to form a complete front sleeve through a mating surface, and the direction of the the the mating surface transitions at a right angle between the open chamber and the fixed chamber, as well as between the bundling chamber and the introduction chamber.

According to one or more embodiments, the mating surface between the first front sleeve half-housing and the second front sleeve half-housing is provided with a snap-in structure on the outer walls on both sides of the bundling chamber, which includes respectively a clamping strip arranged on the mating surface on one side of the first front sleeve half-housing/the second front sleeve half-housing and a corresponding fastener arranged on the mating surface on one side of the second front sleeve half-housing/the first front sleeve half-housing.

According to one or more embodiments, when the clamping strip is arranged on the first front sleeve half-housing and the fastener is arranged on the second front sleeve half-housing, two ends of the clamping strip in the length direction are respectively abutted against the outer wall end face of the fixed chamber and the outer wall end face of the introduction chamber which are opposite to each other.

According to one or more embodiments, the profile of the limiting section along either side of the symmetrical center of the semi-arc limiting convex ring is composed of three segments: a straight segment jointed with the transition section, a bent segment jointed with the straight segment, and a concave segment jointed with the bent segment.

According to one or more embodiments, any two segments of the limiting section or the straight segment and the transition section are directly jointed with each other by a shared edge, and the wall thickness of the semi-arc limiting convex ring at the bent segment is equal to that of the transition section.

According to one or more embodiments, the mating surface between the first front sleeve half-housing and the second front sleeve half-housing is provided with a convex-concave structure on the outer walls on both sides of the fixed chamber, which includes a convex position or concave position on the mating surface of the first front sleeve half-housing and a corresponding concave position or convex position on the mating surface of the front half-housing respectively.

According to one or more embodiments, the end of the plug core is spaced apart from the end of the cable sleeve, and the plug core rear base is connected between the end of the cable sleeve and the end of the plug core, so that the plug core rear base simultaneously wraps the end of the cable sleeve and the end of the plug core.

According to one or more embodiments, a protective sleeve with one end abutting against the end face of the semi-arc limiting convex ring is sleeved outside the plug core, and the end face at the opening of the protective sleeve is closely adhered to the bottom wall of the open chamber.

The disclosure has the beneficial effects that the assembly structure of the front sleeve, which is also a part of the inner sleeve structure, is changed into an asymmetric left-right assembly structure, so that when forming a complete front sleeve structure, the mating surface of the front sleeve itself has a non-single linear force relationship. Regardless of the front sleeve structure being connected by fasteners or adhesive, the requirements for assembly are relatively low, making it convenient to assemble. Moreover, the spring can rely on the front sleeve's own structure to achieve the limitation of the plug core when assembled inside the front sleeve, resulting in a simple and reliable structure, so that the overall structure of the assembled SC connector is suitable for static/dynamic assembly scenarios. Therefore, as a pre-assembled connector, the reliable and simple structure of the connector according to the present disclosure can meet the installation requirements and subsequent usage demands more conveniently and quickly when it is applied to a line assembly.

Figure 1:
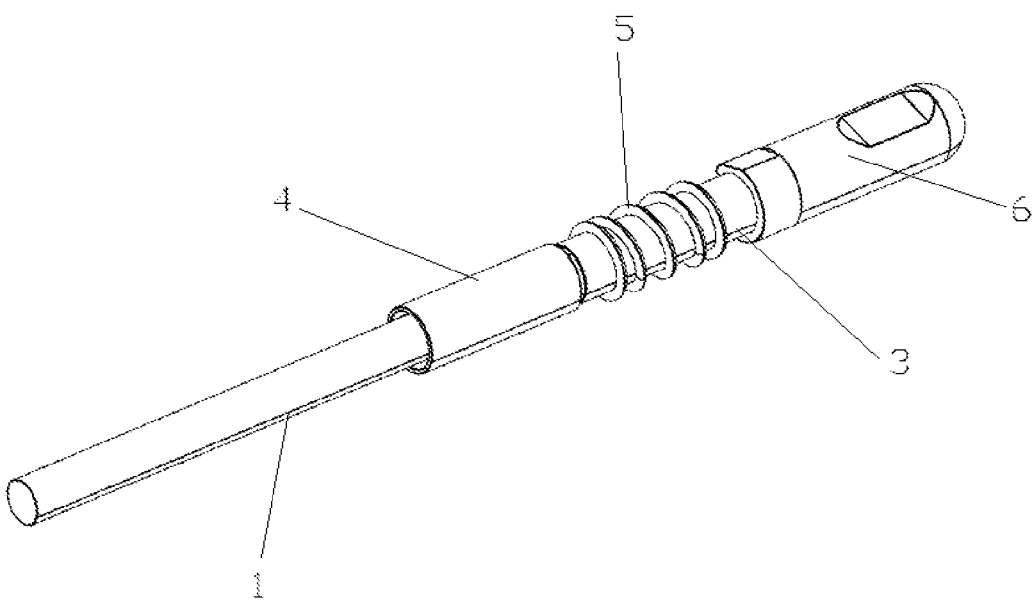
FIG. 1 illustrates a schematic view of the overall structure of an inner core structure.

REFERENCE SIGNS 1 is a cable sleeve, 2 is a plug core, 3 is a plug core rear base, 30 is a limiting ring, 31 is a semi-arc limiting convex ring, 310 is a transition section, 311 is a limiting section, 3110 is a straight segment, 3111 is a bent segment, 3112 is a concave segment, 4 is a sleeve, 5 is a limiting spring, 6 is a protective sleeve, 7 is a pull rod sleeve, 71 is a U-shaped notch, 72 is a clamping piece, 8 is a housing, 9 is a front sleeve, 90 is an open chamber, 91 is a fixed chamber, 92 is a bundling chamber, 93 is an introduction chamber, 94 is a first front sleeve half-housing, 95 is a second front sleeve half-housing, 96 is a engaging convex ring, 97 is a clamping strip, 98 is a fastener, 99 is a convex-concave structure, and 10 is a rear sleeve.

DETAILED DESCRIPTION

The embodiments of the present disclosure will be described below with reference to the attached drawings and related embodiments. The embodiments of the present disclosure are not limited to the following embodiments, and the present disclosure relates to related necessary components in the technical field, which should be regarded as a well-known technology in the art and can be known and mastered by those skilled in the art.

Referring to FIGS. 1-5 and 10, an SC connector with a stable structure and an easy installation comprises a cable body having an optical fiber and a cable sleeve 1 wrapping the optical fiber, and comprises a housing 8, a front sleeve 9 and a rear sleeve 10, wherein the optical cable passes through a plug core rear base 3 and is connected with a plug core 2, and one end of the plug core rear base 3 proximate to the plug core 2 is provided with a semi-arc limiting convex ring 31. The semi-arc limiting convex ring 31 is formed by a semi-arc transition section 310 (at least half of the cross-sectional profile of the semi-arc limiting convex ring 31 is an arc) and a limiting section 311 having a recess (the limiting section 311 may be symmetrical with respect to a plane and has a concave profile); an outer surface of the plug core rear base 3 is tightly sleeved with a limiting spring 5 with one end abutting against an end face of the semi-arc limiting convex ring 31; one end of the plug core rear base 3 proximate to the cable sleeve 1 is provided with a limiting ring 30; and a sleeve 4 covering the limiting ring 30 and a part of the cable sleeve 1 is sleeved on the limiting ring 30, so that the limiting spring 5 is limited between an end face of the sleeve 4 and an end face of the semi-arc limiting convex ring 30.

An inner cavity of the front sleeve 9 is formed by four secondary chambers communicated in sequence, wherein the four chambers are respectively an open chamber 90 for accommodating the plug core 2, a fixed chamber 91 for accommodating the semi-arc limiting convex ring 31 and the limiting spring 5, a bundling chamber 92 for accommodating a part of the plug core rear base 3, and an introduction chamber 93 for accommodating the cable sleeve 1, wherein the bundling chamber 92 has a smaller inner diameter than its adjacent chambers.

The front sleeve 9 is composed of a first front sleeve half-housing 94 and a second front sleeve half-housing 95 which are fitted as a whole, and the fixed chamber 91, the bundling chamber 92 and the introduction chamber 93 are all formed by the combination of the first front sleeve half-housing 94 and the second front sleeve half-housing 95 through closure, while the open chamber 90 is completely formed by an inner cavity of the first front sleeve half-housing 94.

The front sleeve 9 is clamped within the housing, and the end of the plug core 2 extends to the outside of the housing through an opening at one end of the housing.

The rear sleeve 10 extends outside the introduction chamber 93 and the cable sleeve 1, and the front sleeve 9, at a part of the introduction chamber 93, is provided with an engaging convex ring 96 for abutting against the inner wall of the rear sleeve 10.

Figure 10:
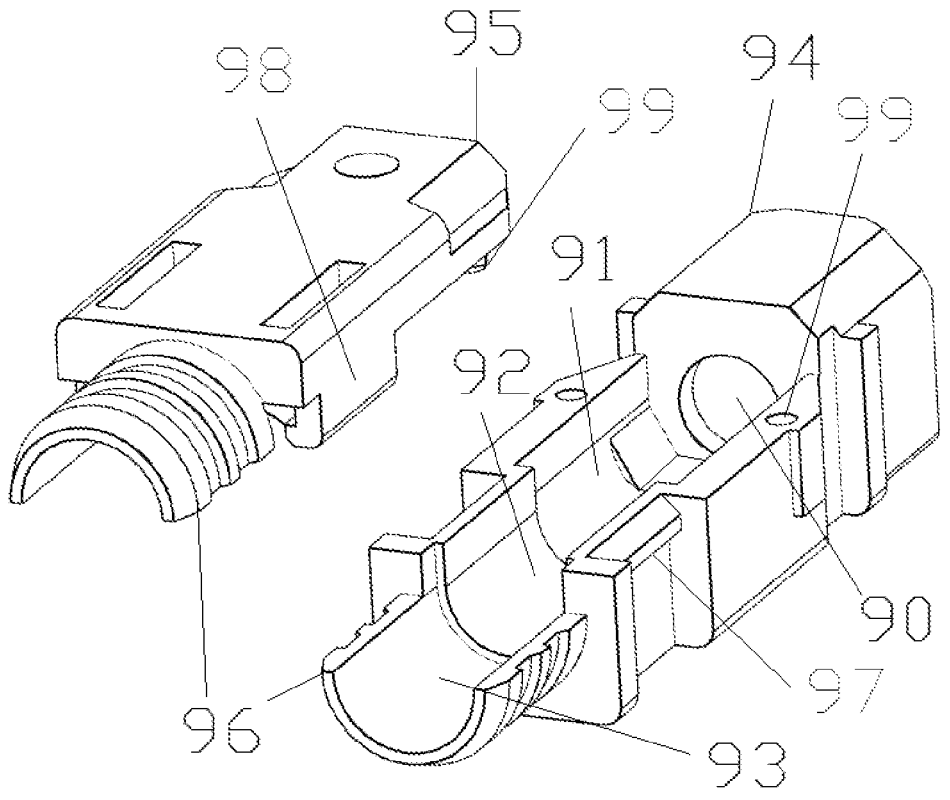
FIG. 10 illustrates a schematic structural view of a front sleeve.

In the present disclosure, as shown in FIG. 10, the combined structure of the front sleeve 9 structure is formed by coordinating the first front sleeve half-housing 94 and the second front sleeve half-housing 95 which are not symmetrically opened, and their inner chambers can be provided with limiting features such as grooves, planes, round surfaces, etc., so that they can better cooperate with different parts of the inner core structure, especially with the plug core rear base 3 which can avoid the rotation of the inner core structure.

It has good assembly directionality, and can easily realize the assembly of the whole structure even in low-light conditions. In particular, the first front sleeve half-housing 94 according to the disclosure also has a complete open chamber 90 for accommodating the plug core 2, so that the first front sleeve half-housing 94 forms an asymmetric assembly structure. While achieving stable matching with a part of the inner core structure, the outer housing of the open chamber 90 abuts against an end face, at the fixed chamber 91, of the second front sleeve half-housing 95, so that the first front sleeve half-housing 94 and the second front sleeve half-housing 95 can have relatively more contact areas and non-coplanar force relationships in different directions/planes. And the multidimensional force relationships contribute to the improvement of assembly stability. This will not cause reduction of overlapping areas due to the apparent asymmetry of the mating parts which leads to problems that the adhesive contact area may decrease in subsequent adhesive introduction steps and adhesive strength may decrease. Moreover, in a complex environment, the assembly structure is advantageous for achieving quick-and-easy assembly during on-site assembly. Whether used as a pre-assembled connector or an on-site connector, the proposed mating solution is beneficial for enhancing the overall stability and simplifying the use of the connector structure.

In the part where the plug core rear base 3 of the inner core structure is jointed with the cable sleeve 1 wrapped with optical cable, the optical cable beyond the part of the cable sleeve 1 can be made longer, and the structures such as the limiting spring 5 and the cable sleeve 1 wrapped around the plug core rear base 3 are all part of the assembly structure contained within the connector. In the present disclosure, a limiting spring 5 is arranged between the semi-arc limiting convex ring 31 and the limiting ring 30, which is tightly sleeved on the outer surface of the plug core rear base 3, ensuring a sufficient compactness for a part used to fix the inner core structure. According to one or more embodiments, the plug core rear base 3 and the limiting spring 5 are similar in overall outer diameter and closely matched, so that the plug core rear base 3 can adapt to more connector sleeve structures in specific assemblies. A fit between the sleeve structure and the plug core rear base 3 allow for a certain gap but not a significant gap fit, resembling a transition fit, which allows production technicians to inject a small amount of adhesive, rather than requiring a large amount of adhesives. Therefore, in a most ideal situation, the production technicians can completely fix the inner core structure and the connector sleeve structure with only a small amount of adhesive. Alternatively, choosing only a close assembly relationship between the limiting spring 5 and the plug core rear base 3 allows the limiting spring 5 to abut between the semi-arc limiting protrusion 31 and the fixed chamber 91 structures, achieving a complete abutment. In cases where the sleeve body structure is relatively compact, this can result in a tightly abutted assembly structure, forming a stable assembly structure.

On this basis, the production technicians further fix the outer sheath and Kevlar structure of the optical cable to realize the force transmission. Compared with the prior art, the sleeve body structure and the core structure can only be combined by crimping, which may cause a lot of gaps due to an improper structural design. This can impact the assembly and combination of the inner core structure, which is not conducive to the assembly of SC connectors, and cannot be used as a versatile inner core structures for other connectors such as FC and LC connectors.

When the inner core structure according to the present disclosure is used as an inner core for connectors with different specifications, such as FC, LC, since the assembly mode of the inner core structure according to the disclosure is very compact, when the inner core structure is matched with the sleeve structure of connectors with different specifications, it allows for a direct assembly or an adhesive injection. With the inner core structure itself being compact and stable, the stability of the overall structure of the connector can meet the requirements only by ensuring the assembly stability between the external part of the inner core structure and the sleeve structure, without worrying about instability or detachment issues when applying to connectors with different specifications.

Furthermore, when the limiting spring 5 is assembled on the inner core structure, it is very easy to cooperate with the front sleeve 9 inside the connector sleeve structure. This makes it similar to the existing white inner core, making it easy to be compatible with conventional on-site SC connectors or directly set in pre-assembled SC connectors, eliminating the need for reassembly, and with lower assembly difficulty.

Figure 2:
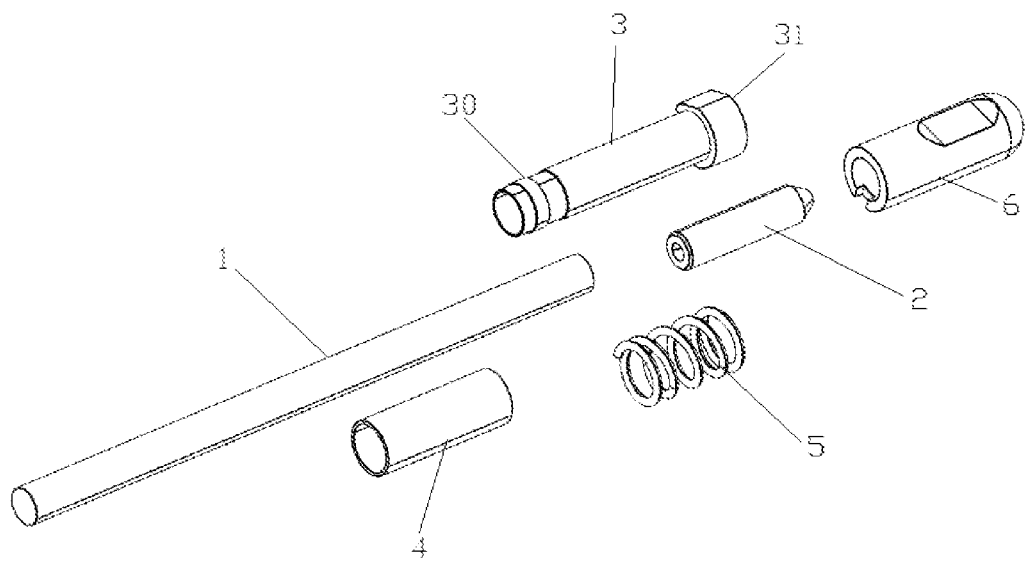
FIG. 2 illustrates a schematic view of the explosion structure of an inner core structure.

As a supplementary illustration, referring to FIG. 1 and FIG. 2, it is necessary to point out here that one end of the plug core rear base 3 near the cable sleeve 1 is provided with a limiting ring 30, and a sleeve 4 covering the limiting ring 30 and a part of the cable sleeve 1 is sleeved outside the limiting ring 30, so that the limiting spring 5 is limited between an end of the sleeve 4 and an end face of the semi-arc limiting convex ring 30. The sleeve 4 is slightly smaller than the limiting ring 30, which is beneficial to the tight assembly between the sleeve 4 and the plug core rear base 3, helps to improve the stability of the overall structure, and makes it more suitable for scenarios where white inner cores of different connectors are used. Further, the sleeve 4 is preferably positioned to just abut against the limiting spring 5, preventing the limiting spring 5 from coming loose. If it does not abut against the limiting spring 5, there is a possibility of backward movement during air blowing or cable threading, leading to a malfunction of the limit, which is not conducive to the subsequent connector assembly and will affect the stability of the connector after assembly. Therefore, providing the sleeve 4 in this position effectively prevents the issue of the sleeve structure moving behind the cable sleeve 1 before being assembled onto the connector.

The rear sleeve 10 simultaneously wraps around the cable sleeve 1, the sleeve 4 and the end of the front sleeve 9, which plays the role of connection, while the front sleeve 9 reasonably accommodates the inner core structure through four chambers with different functions and structures, and closely abuts with the inner core structure, thus minimize the gap between the front sleeve 9 structure and the inner core structure, and leaving a certain space for injecting adhesive to meet the needs of different assemblies. The fixing cavity 91 is preferably closely matched with the limiting spring 5, resulting in a limited space for the adhesive injection. However, it still meets the stability requirements. The bundling chamber 92 prevents the possibility of radial shaking of the inner core structure and provides a stop structure to prevent the adhesive from further flowing, which can also reduce the use amount of adhesive on the premise of facilitating the overall assembly stability. The front sleeve 9 is clamped in the housing 8 to form a complete integrated SC connector. Additionally, it can be assembled as needed, serving as an alternative to regular quick-connect connectors or field-fused connector heads, offering great flexibility.

The SC connector structure described above, with its overall tightness and stable fit, exhibits excellent resistance to environmental disturbances when used on equipment with certain vibrations or other environmental interferences. Therefore, it has a predictable and obvious impact on the extension of the service life of the cable, and also reduces the material and labor costs associated with routine maintenance and consumable replacements.

The specific application scene according to the present disclosure include installation in conventional pipelines, direct exposure within rooms or equipment, such as fiber-to-the-home setups, or remote installations that require equipment assistance with longer assemblies or installations that the connector can be assembled using a traction method in buried underground conduits. Since the conventional SC connector is bulky after assembly and is not easy to p thread through conduits. If only the inner core structure is threaded, the existing inner core structure, with insufficient compactness in the assembly, is not conducive to the assembly of the cable in harsh environmental conditions. According to the present disclosure, the inner core structure is compact enough, and the rational and stable structural combination of the front sleeve 9 allows for the assembly of the limiting spring 5 with a diameter larger than the diameter of the introduction chamber 93. The limiting spring 5 can better resist the inner wall of the front sleeve 9 and the fiber core cable, meeting the requirement of minimizing volume for ease of conduit threading. This not only reduces the difficulty of post-threading assembly but also ensures stable assembly and maintains good structural stability.

As shown in FIG. 10, as one of the preferred embodiments of the present disclosure, the first front sleeve half-housing 94 and the second front sleeve half-housing 95 are combined into a complete front sleeve 9 through a mating surface, the direction of the mating surface transitions at a right angle between the open chamber and the fixed chamber, as well as between the bundling chamber and the introduction chamber. In this embodiment, with the right-angle transition connection, when a force is applied along the axial direction of the optical cable, the first front sleeve half-housing 94 and the second front sleeve half-housing 95 can mutually abut with each other in a form of maximum contact force to form a limiting effect. Due to the asymmetrical shape, the assembly process is more suitable for operators to prevent errors in coordination, ensuring the overall stability of the connector after the final assembly. This is particularly advantageous for robustness in dynamic usage environments.

Referring to FIG. 10, as one of the preferred embodiments of the present disclosure, the mating surface between the first front sleeve half-housing 94 and the second front sleeve half-housing 95 is provided with a snap-in structure on the outer walls at both sides of the bundling chamber 92, and the snap-in structure include a clamping strip 97 arranged on the mating surface at one side of the first front sleeve half-housing 94/the second front sleeve half-housing 95, and a fastener 98 arranged at a corresponding position on the mating surface of one side of the second front sleeve half-housing 95/the first front sleeve half-housing 94. The snap-in structure can arrange the clamping strip 97 and the fastener 98 on the mating surface of the first front sleeve half-housing 94 or the second front sleeve half-housing 95 according to the selection, so as to realize accurate alignment and stable assembly during the assembly process.

Referring to FIG. 10, as one of the preferred embodiments of the present disclosure, when the clamping strip is arranged on the first front sleeve half-housing 94 and the fastener 98 is arranged on the second front sleeve half-housing 95, two ends of the clamping strip 97 in the length direction are respectively abutted against the outer wall end face of the fixed chamber 91 and the outer wall end face of the introduction chamber 93 which are opposite to each other. As a further preferred option of the previous embodiment, since the clamping strip 97 is relatively recessed, it is more suitable for an area similar to the dumbbell position between the outer wall end face of the fixing cavity 91 and the outer wall end face of the introduction chamber 93 of the first front cover half-housing 94 as shown in FIG. 10, so as to realize the stable force transmission and improve the stability of the assembled connector. Moreover, under the action of mutually vertical mating surface, the clamping alignment difficulty between the snap-in structures is also reduced. As they can be quickly aligned and butted through the vertical mating surface, the assembly is very convenient, and the front sleeve structure can even be assembled in extremely low light conditions.

Figure 3:
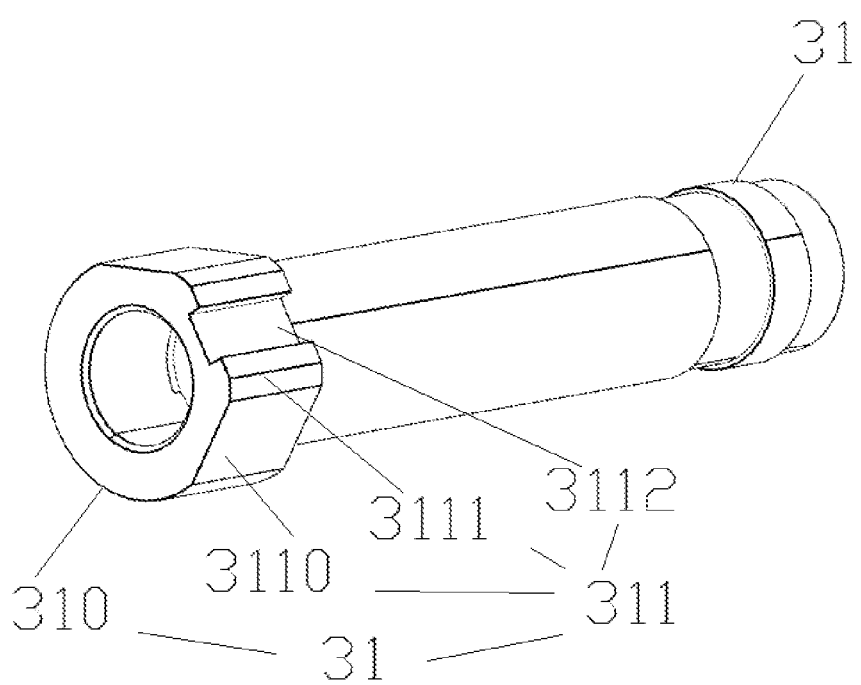
FIG. 3 illustrates a schematic structural view of a plug core rear base.

Referring to FIG. 2 and FIG. 3, as one of the preferred embodiments of the present disclosure, the profile of the limiting section 311 along either side of the symmetrical center of the semi-arc limiting convex ring 31 is composed of three segments: a straight segment 3110 jointed with the transition section 310, a bent segment 3111 jointed with the straight segment 3110, and a concave segment 3112 jointed with the bent segment 3111. In the present disclosure, the structure of the limiting section 311 balances good assembly adaptability, that is the symmetrical structure, and exhibits excellent anti-spin obstruction resistance achieved by the cooperation between the concave segment 3112 with good clamping ability and the straight segment 3110 with good face abutment capability. Therefore, for the plug core rear base 3, the internal core structure according to the present invention can have good assembly and positioning characteristics when assembled with the connector's sleeve structure, improving the overall structural stability after assembly.

Referring to FIG. 3, as one of the preferred embodiments of the present disclosure, any two segments of the limiting section 311 or the straight segment 3110 and the transition portion 310 are directly jointed with each other by a shared edge, and the wall thickness of the semi-arc limiting convex ring 31 at the bending segment 3111 is equal to the wall thickness of the transition portion 310. This structure is based on the characteristics of the limiting section 311 with a symmetrical structure. Taking an edge-like form as a transition structure between different segmented structures or between the straight section 3110 and the transition section 310 can ensure that there is not excessive difference in structural strength between the transition section 310 with uniform wall thickness and the limiting section 311 with the same symmetrical structure, and the strength of the edge-like transition structure is guaranteed, which is conducive to improving the strength of the symmetrical snap-in structure formed by the concave section 3112 connected to the bent section 3111. This design is advantageous for simplifying subsequent assembly processes and improving assembly strength.

Referring to FIG. 10, as one of the preferred embodiments of the present disclosure, the mating surface between the first front sleeve half-housing 94 and the second front sleeve half-housing 95 is provided with a convex-concave structure 99 in cooperation with each other on the outer walls on both sides of the fixed chamber 91, which includes a convex position or concave position on the mating surface of the first front sleeve half-housing 94 and a concave position or convex position on the mating surface of the second front sleeve half-housing 95 respectively. This embodiment is a further structure for improving the structural assembly stability of the front sleeve 9 of the connector. Especially, in combination with the asymmetric clamping structure characteristics of the front sleeve 9, the convex-concave structure 99 is designed to be more easily limited by the contact force between the mutually vertical mating surfaces. This allows for better integration of the connected connector structure, and the clamping alignment difficulty between the convex-concave structures 99 is reduced, making it convenient for them to quickly align and abut through the perpendicular mating surface.

Referring to FIG. 2 and FIG. 3, as one of the preferred embodiments of the present disclosure, the end of the plug core 2 is spaced from the end of the cable sleeve 1, and a plug core rear base 3 is connected between the end of the cable sleeve 1 and the end of the plug core 2, so that the plug core rear base 3 simultaneously wraps the end of the cable sleeve 1 and the end of the plug core 2.

It should be pointed out that, as an integral part of the tight assembly structure, the limiting ring 30 and the semi-arc limiting convex ring 31 provided in the plug core rear base 3 are equally essential components to meet the requirement of tight assembly. The outer side of the limiting ring 30 has an interference fit with the sleeve 4 and the inner side has a clearance fit with the cable sleeve 1. Combined with the scheme of the previous embodiment, in this embodiment, the limiting spring 5 tightly sleeved on the outer surface of the plug core rear base 3 is located between the semi-arc limiting convex ring 31 and the limiting ring 30, and the limiting section in the semi-arc limiting convex ring 31 does not simply limiting the ring structure, but is composed of at least a semi-arc transition section 310 and a limiting section 311 which is symmetrical to the cross section center and has a concave profile that are mutually closed and connected, so that the limiting section has obvious rotational interference. As long as the sleeve structure of the connector is matched with the limiting section 311, the transition section 310 can't rotate relative to the sleeve structure and is completely locked, and then the inner core structure can be formed into a robust whole through the other closely matched structures.

Referring to FIG. 1 and FIG. 2, as one of the preferred embodiments of the present disclosure, a protective sleeve 6 with one end abutting against the end face of the semi-arc limiting convex ring 31 is sleeved outside the plug core 2, and the end face at the opening of the protective sleeve 6 is closely adhered to the bottom wall of the open chamber 90. The arrangement of the protective sleeve is the same as that in the prior art. However, in conjunction with the stability of the structure of the front sleeve 9 described in the present invention, especially the complete non-mold structure of the open chamber 90, the protective cover 6, when in contact with the open chamber 90, can achieve the same assembly effect as the existing integral front sleeve structure without being affected by the left and right mold matching structure of the front sleeve 9.

Figure 4:
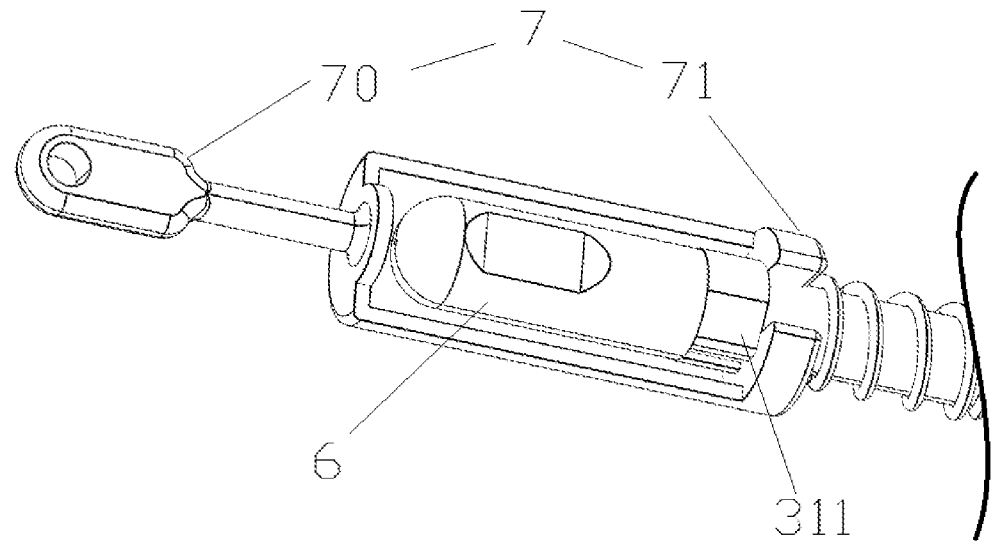
FIG. 4 illustrates a first assembly schematic view of an inner core structure and a pull rod sleeve.
Figure 5:
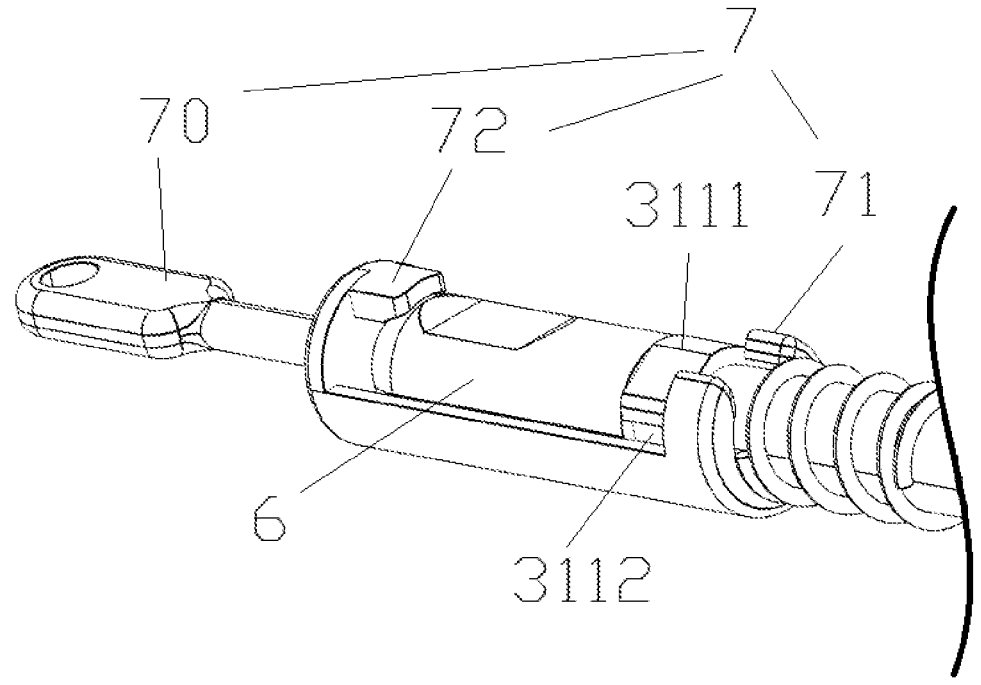
FIG. 5 illustrates a second assembly view of an inner core structure and a pull rod sleeve.
Figure 6:
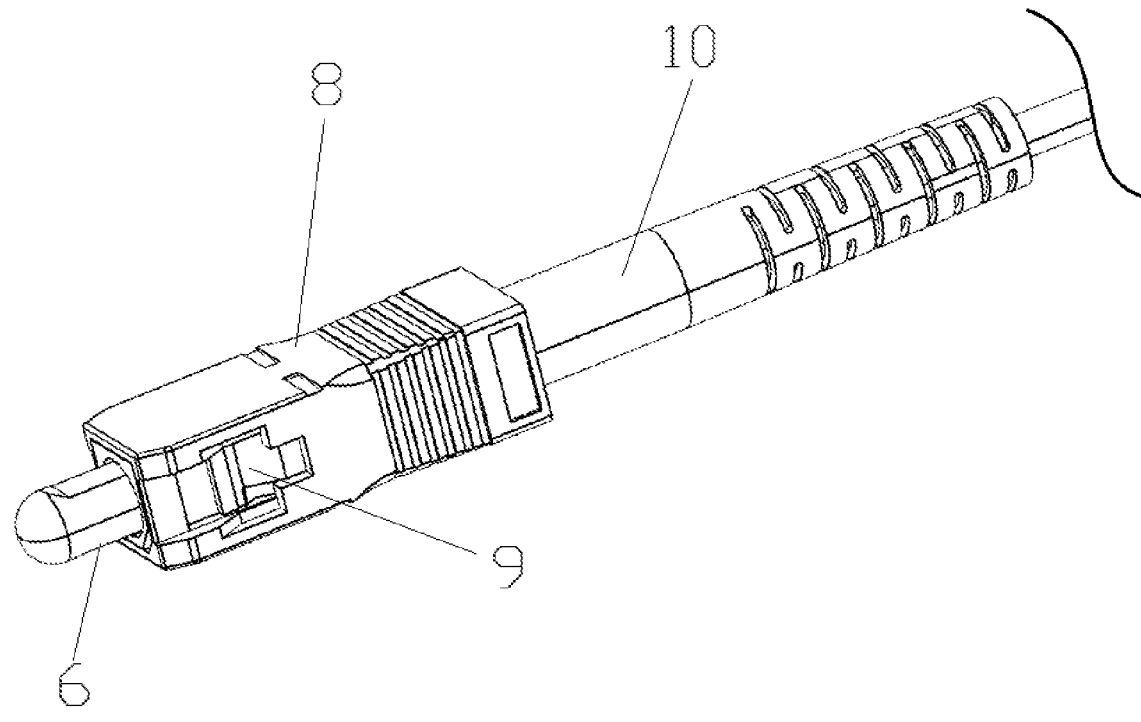
FIG. 6 illustrates a schematic view of the overall structure of an SC connector assembled with a main part of the inner core structure.
Figure 7:
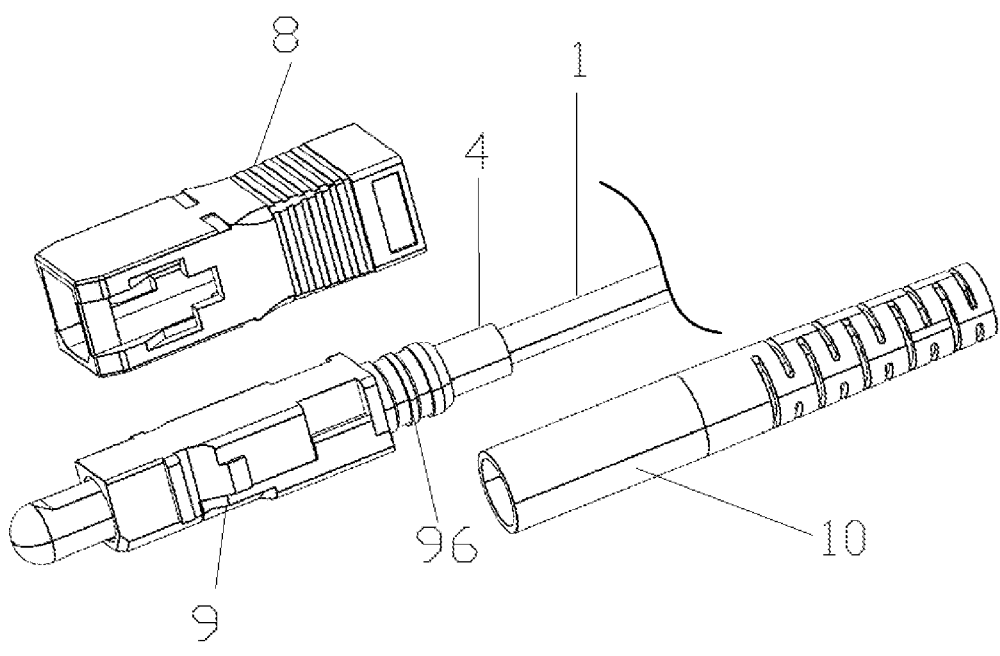
FIG. 7 illustrates a schematic view of the explosion structure of the SC connector shown in FIG. 6.
Figure 8:
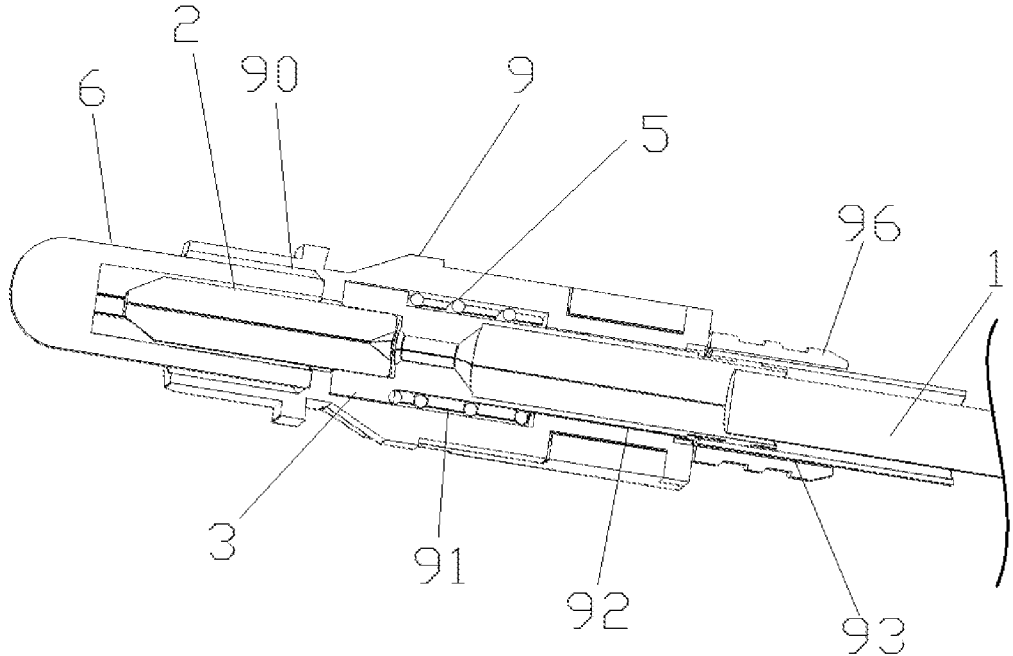
FIG. 8 illustrates a schematic sectional view of the rear part of the housing without the SC connector shown in FIG. 6.
Figure 9:
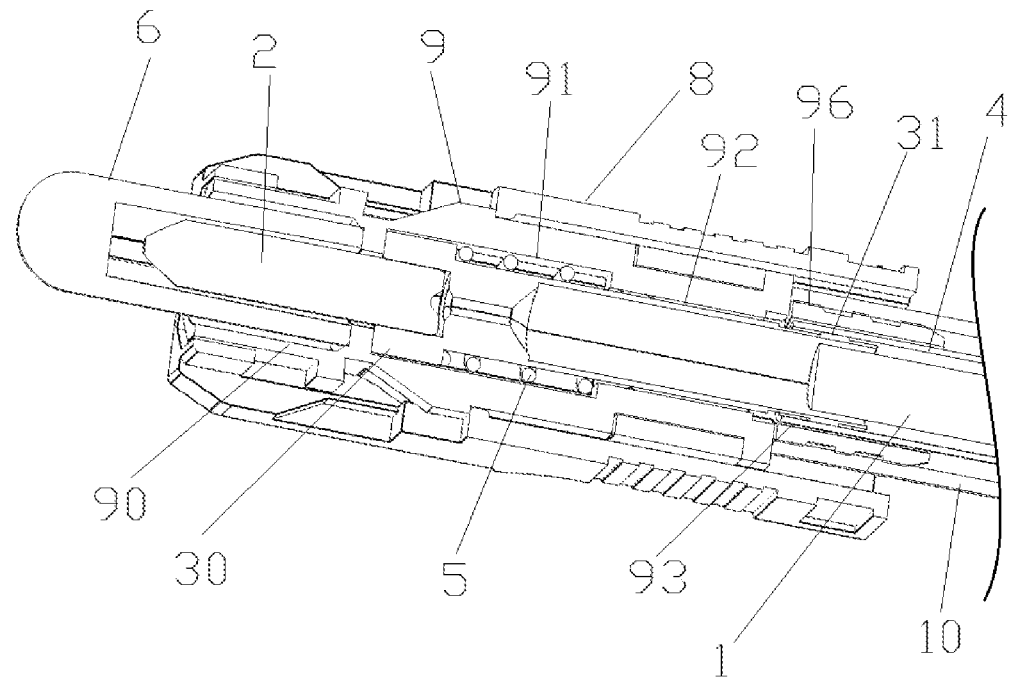
FIG. 9 illustrates a schematic view of the overall sectional structure of the SC connector shown in FIG. 6.

Referring to FIG. 4 and FIG. 5, as one of the preferred embodiments of the present disclosure, this connector can be used in situations such as air blowing and conduit threading, where a pull rod sleeve 7 needs to be provided. An end of the pull rod sleeve 7 near the pull rod 70 is also provided with a clamping piece 72 facing the other end with a U-shaped notch 71. A surface of the clamping piece 72 near the center side of the pull rod sleeve 7 abuts against an end of the protective sleeve 6 and cooperates with the other end of the U-shaped notch 71 of the pull rod sleeve 7, thereby limiting one end of the protective sleeve 6 and the plug core rear base 3 within the pull rod sleeve 7. The setting of the pull rod sleeve 7 is to better ensure the integrity of the cable joint structure when threading the cable. Based on the structure in FIG. 4, the pull rod sleeve 7 can also increase the assembly tightness with the main body structure of the inner core, i.e., other parts of the structure. The additional clamping piece 72 abutting the end of the protective cover 6 further enhances assembly stability, making the present invention more suitable for various assembly line situations, especially in cases of air blowing and conduit threading. The stable structure described above can significantly reduce the occurrence of disconnection during the assembly process, improving assembly efficiency.

The above merely describes specific embodiments of the present disclosure, which is not intended to limit the scope of protection of the present disclosure. Any modifications, equivalent variations or substitutions, and improvements made within the spirit and principle of the present disclosure by those skilled in the art according to the disclosed technical scope should be included in the protection scope of the present disclosure.

What is claimed is:

1. An SC type of connector, comprising a cable body including an optical cable and a cable sleeve wrapping the optical cable, wherein the connector comprises a housing, a front sleeve and a rear sleeve, wherein the optical cable passes through a plug core rear base and is connected with a plug core, and an end of the plug core rear base proximate to the plug core is provided with a semi-arc limiting convex ring formed by a semi-arc transition section and a limiting section having a recess, an outer surface of the plug core rear base is sleeved with a limiting spring with one end abutting against an end face of the semi-arc limiting convex ring, an end of the plug core rear base proximate to the cable sleeve is provided with a limiting ring, and a sleeve covering the limiting ring and a part of the cable sleeve is sleeved on the limiting ring, so that the limiting spring is limited between an end face of the sleeve and an end face of the semi-arc limiting convex ring;

an inner cavity of the front sleeve is formed by four separate chambers, wherein the four chambers are respectively an open chamber for accommodating the plug core, a fixed chamber for accommodating the semi-arc limiting convex ring and the limiting spring, a bundling chamber for accommodating a part of the plug core rear base, and an introduction chamber for accommodating the cable sleeve, wherein the bundling chamber has a smaller inner diameter than its adjacent chambers;

the front sleeve consists of a first front sleeve half-housing and a second front sleeve half-housing which are integrated as a whole, and the fixed chamber, the bundling chamber and the introduction chamber are all formed by the combination of the first front sleeve half-housing and the second front sleeve half-housing through closure, while the open chamber is completely formed by an inner cavity of the first front sleeve half-housing, and an outer surface of the front sleeve, at the introduction chamber, is provided with an engaging convex ring abutting against an inner wall of the rear sleeve;

the front sleeve is clamped within the housing, and an end of the plug core extends to an outside of the housing through an opening at one end of the housing; and the rear sleeve is sleeved on the introduction chamber and the cable sleeve, and the front sleeve, at the introduction chamber, is provided with an engaging convex ring abutting against the inner wall of the rear sleeve.

2. The connector according to claim 1, wherein the first front sleeve half-housing and the second front sleeve half-housing are attached and combined with each other to form a complete front sleeve through two mating surfaces which are perpendicular to each other.

3. The connector according to claim 2, wherein the first front sleeve half-housing and the second front sleeve half-housing are connected by a snap fit connection consisting of a male part and a female part, and wherein the male part is arranged on any one of the first front sleeve half-housing and the second front sleeve half-housing, and the female part is arranged on another.

4. The connector according to claim 3, wherein in the case of that the male part is arranged on the first front sleeve half-housing and the female part is arranged on the second front sleeve half-housing, the female part extends from a wall at least partly defining the fixed chamber to a wall at least partly defining the introduction chamber.

5. The connector according to claim 2, wherein the first front sleeve half-housing and the second front sleeve half-housing are connected through a hole-shaft fit connection consisting of a hole and a shaft, wherein the shaft is arranged on any one of the first front sleeve half-housing and the second front sleeve half-housing, and the hole is arranged on another.

6. The connector according to claim 1, wherein the limiting section has a flat portion adjacent to the transition section, a bending portion adjacent to the flat portion, and a portion defining the recess.

7. The connector according to claim 6, wherein the flat portion of the limiting section has a thickness same as the transition section.

8. The connector according to claim 1, wherein the end of the plug core is spaced apart from the end of the cable sleeve, and the plug core rear base is arranged between the end of the cable sleeve and the end of the plug core, and the plug core rear base simultaneously wraps the end of the cable sleeve and the end of the plug core.

9. The connector according to claim 1, wherein a protective sleeve with one end abutting against the end face of the semi-arc limiting convex ring is sleeved on the plug core, and an end face of the protective sleeve is closely adhered to a bottom wall of the open chamber.

* * * * *